United States Patent Office 3,619,896
Patented Nov. 16, 1971

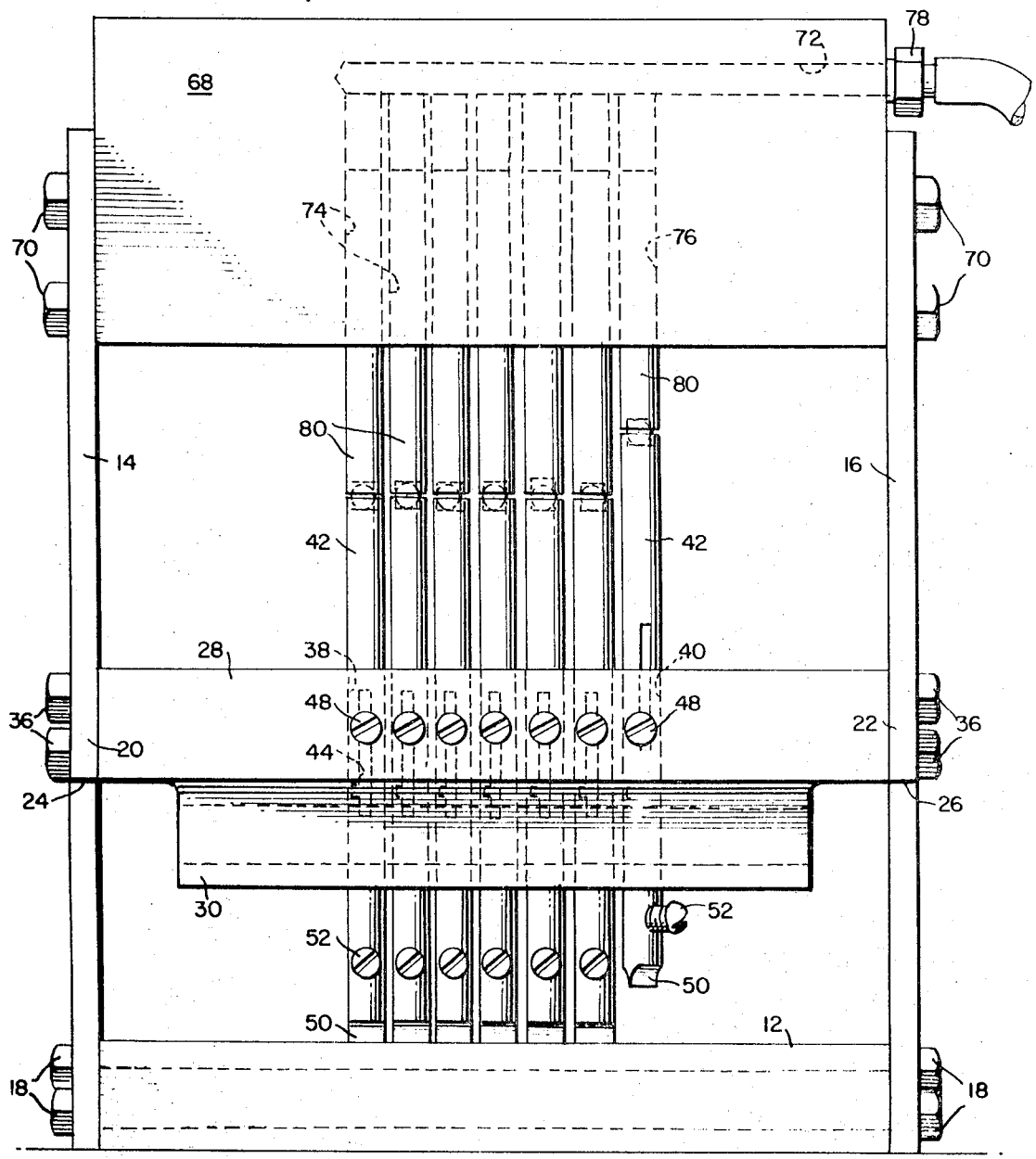

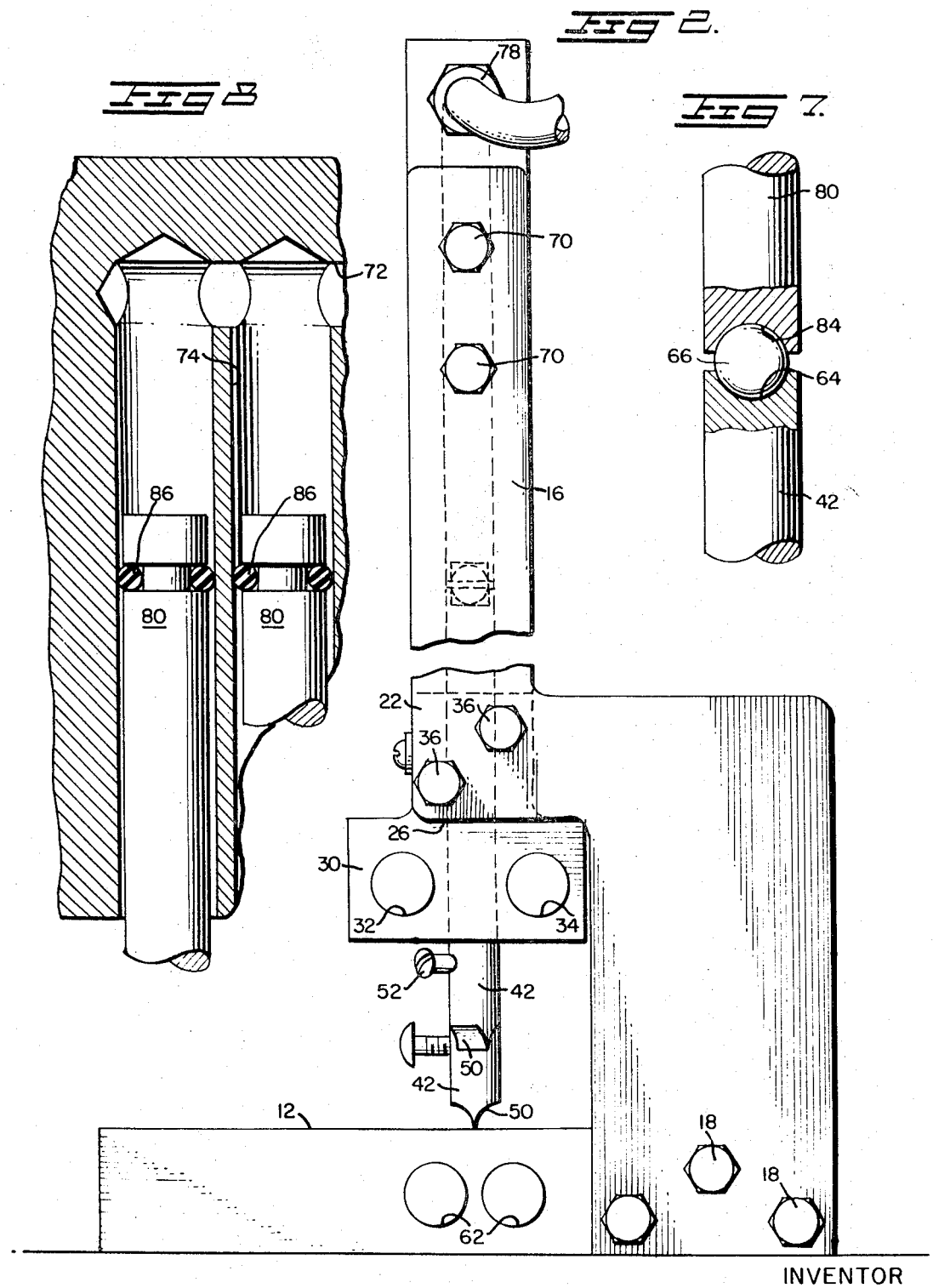

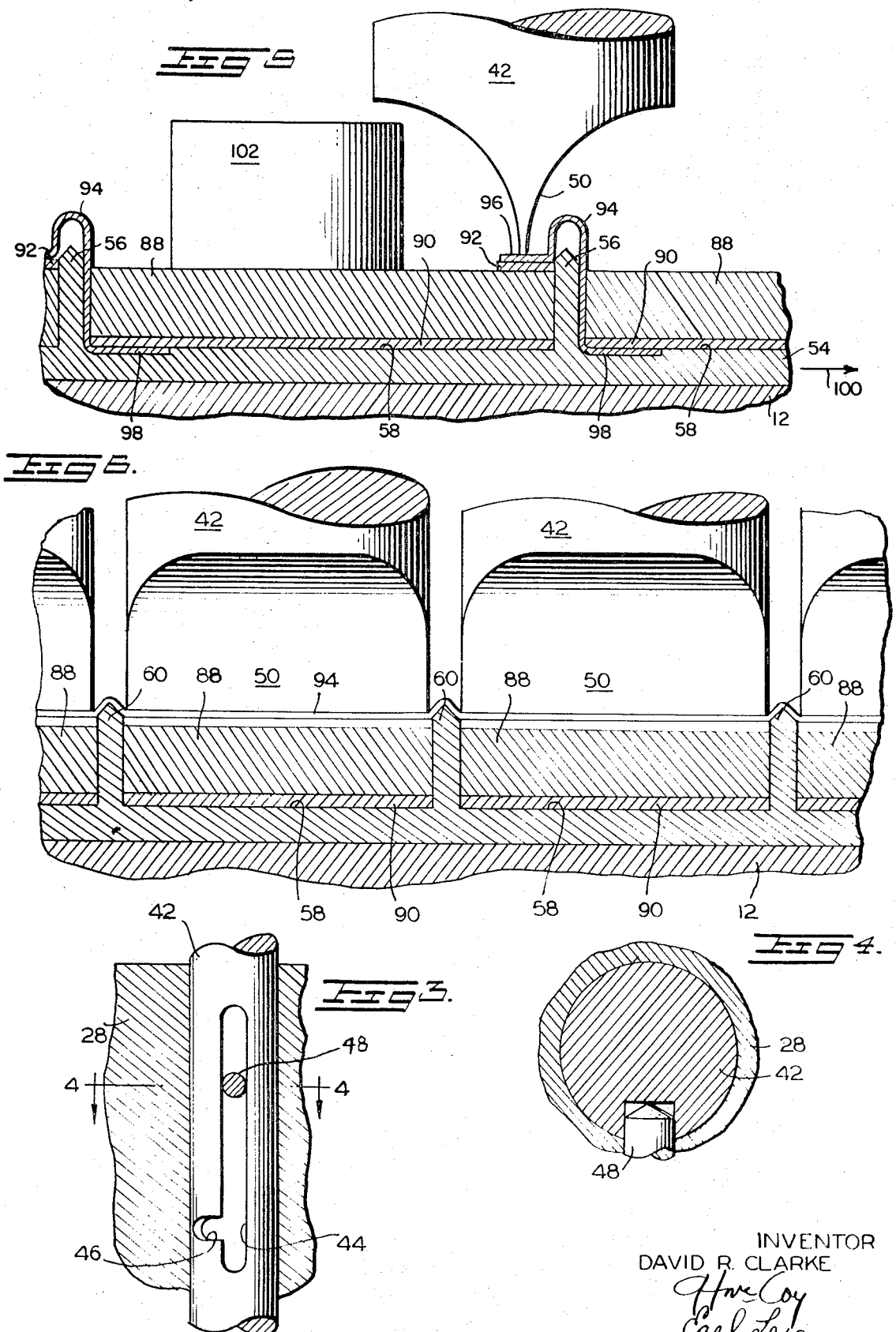

3,619,896
THERMAL COMPRESSION BONDING OF INTERCONNECTORS
T. O. Paine, Acting Administrator of the National Aeronautics and Space Administration, in respect to an invention of David R. Clarke, Bellevue, Wash.
Filed Feb. 27, 1969, Ser. No. 802,813
Int. Cl. B23k 31/02
U.S. Cl. 29—473.1    3 Claims

ABSTRACT OF THE DISCLOSURE

A method and apparatus for diffusion bonding of dissimilar metals wherein dissimilar metal parts to be joined are placed on a transversely slidable tray located on a table, the table being provided with a pair of spaced uprights and carrying a pressurized air manifold having a plurality of pressurized air actuated pistons depending therefrom, each of the pistons being provided at its end thereof with a refractory material of spherical configuration. In vertical spaced relationship below the manifold a cross arm is supported between the pair of upright rails. The cross arm, slidably supports a plurality of vertical plungers, each of which is provided with a longitudinal slot for receiving the end of a set screw that retains each plunger on the cross arm. One end of each plunger engages a respective spherical end portion of a piston, the other end of the plunger being of wedge configuration and adapted to clamp the dissimilar metals to be joined between it and the top surface of the tray. The table and the cross arm are each provided with laterally extending bores therethrough for accepting a cartridge type resistance heater. The assembly is placed within an evacuation chamber wherein the dissimilar metal parts are diffusion bonded by the application heat and force transmitted through the table and the wedge-shaped end portion of the plungers.

---

The invention described herein was made in the performance of work under a NASA contract and is subject to the provisions of Section 305 of the National Aeronautics and Space Act of 1958, Public Law 85–568 (72 Stat. 435; 42 USC 2457).

The present invention relates to joining of dissimilar metals and, more specifically, to a method and apparatus for diffusion bonding dissimilar metals utilizing only heat and pressure.

The present invention was conceived for joining a silver mesh interconnector to a silver-titanium electrical terminal of a silicon solar cell. However, it is understood that the apparatus process to be described in detail may be utilized to join a variety of metal parts by the application of pressure in the range of above one-half the yield strength of a metal part to be joined and a temperature in the range of above one-half the melting point of a metal part to be joined.

According to the process of the present invention, a silver mesh interconnector is joined to the silver-titanium contact of a silicon solar cell. The silver mesh interconnector is placed in overlapping relationship with respect to the contact and a pressure of 1,000 p.s.i. is applied to the joint. The joint is heated to 400° C. in a vacuum environment for a soaking period of 20 minutes. The application of such heat and pressure partially diffuses the silver contents of each metal part into the adjoining metal part, thereby creating an electrically conducting silver to silver bond.

The invention is further directed to apparatus for manufacturing a diffusion bond as described. According to the invention, a table is provided with a pair of spaced uprights, the uprights carrying a cross arm which is vertically spaced with respect to the table. A plurality of force transmitting plungers are slidably mounted in depending relationship from the cross-arm and are provided with wedge-shaped end portions. Immediately under the depending, wedge-shaped end portions of the plungers is a slidable tray mounted on the table. The metal parts to be joined are clamped between the end portions of the depending plungers and the tray. The cross arm and the table are provided with bores for receiving resistance heaters therein. The required pressure utilized for joining the metal parts is provided by an air pressure manifold mounted between the spaced uprights and in vertical spaced relationship with respect to the cross arm. The manifold is provided with a plurality of slidable depending pistons, actuated by air pressure from the manifold. The end portions of the pistons terminate in a spherical refractory material engaging a respective plunger. The spheres of refractory material prevent conduction of heat from the resistance heaters into the manifold. In practice, the apparatus is placed in an evacuation chamber and the application of heat and pressure transmitted through the wedge-shaped portions of the plungers causes the required diffusion bonding.

It is therefore an object of the invention to provide a method and apparatus for diffusion bonding metal parts upon the application of heat and pressure.

A further object of the invention is to provide a plurality of plungers which may be selectively utilized to create diffusion bonds of a desired number and in a desired locality.

Other objects and many attendant advantages of the present invention will become apparent upon a further perusal of the following detailed description thereof taken in conjunction with the accompanying drawings wherein:

FIG. 1 is an elevation of apparatus according to the invention;

FIG. 2 is a side elevation of the apparatus as shown in FIG. 1;

FIG. 3 is an enlarged fragmentary detail section of a portion of the device of FIG. 1;

FIG. 4 is a section on the line 4—4 of FIG. 3;

FIG. 5 is an enlarged fragmentary, detail section of the table and plungers of the device of FIG. 1 and further illustrating a tray containing a plurality of metal parts to be joined;

FIG. 6 is an enlarged fragmentary, detail section of the table and plungers of the device of FIG. 1 and illustrating further the details of the structure shown in FIG. 5;

FIG. 7 is an enlarged fragmentary, detail section of the plungers and associated pistons of FIG. 1; and FIG. 8 is an enlarged fragmentary, detail section of a portion of the air manifold of the device shown in FIG. 1.

With more particular reference to the drawings, there is shown in FIGS. 1 and 2 apparatus, generally indicated at 10, for the manufacture of a diffusion bond according to the process of the present invention. The apparatus 10 is provided with an enlarged rectangular table 12 having affixed thereto a pair of opposed upstanding rails 14 and 16 secured to the base 12 adjacent corners thereof by machine screws 18. As shown in FIGS. 1 and 2, the rails 14 and 16 are offset at 20 and 22, respectively, defining thereby inverted shoulder portions 24 and 26. Mounted between the rails 14 and 16 and immediately above the inverted shoulders 24 and 26 is a generally rectangular cross arm 28 provided centrally thereof with a depending generally rectangular heater block 30, axially aligned with, but of shorter length than the cross arm 28.

As shown in FIG. 2, the heater block is of larger rectangular cross-section than the cross arm 28 and is provided therethrough with a pair of aligned, relatively widely spaced bores 32 and 34. For example, the heater block 30 is secured to the offset portions 20 and 22 of the rails 14 and 16 by machine bolts 36. The cross arm and the heater block are provided with a plurality of parallel vertical, relatively closely spaced bores, exemplary ones of which are shown at 38 and 40. Each of the bores, such as the bores 38 and 40, slidably receive therethrough a generally cylindrical plunger 42.

As shown in FIG. 2, the relatively wide spacing of the bores 32 and 34 longitudinally of the heater block 30 provides clearance therebetween for each of the plungers 42. As shown in FIG. 3, each of the plungers 42 is provided with an elongated slot 44 within the confines of the cross arm and heater block. Adjacent the lower end portion of each of the slots 44 is a laterally extending slot portion 46 for a purpose to be hereinafter explained.

As shown in FIGS. 1, 2 and 3, a laterally extending machine screws 48 are threadably secured to the cross-arm 28 and in registration with a slot 44 of a respective one of the plungers 42, the machine screws 48 slidably retaining the plungers within the cross arm 28. The lowermost end of each plunger is configured in a wedge portion as shown at 50. Adjacent each of the wedge-shaped portions 50 and in vertical spaced relationship thereto a protruding machine screw 52 is provided on each of the plungers.

With reference to FIGS. 5 and 6, the table 12 may be provided with a tray, shown in section at 54. The tray may be recessed in the table 12.

As shown in FIG. 5, the tray is provided with spaced, parallel upstanding ridges, only two of which are shown at 56. The ridges define therebetween rows of recesses, two of which are indicated at 58. As shown in FIG. 6, the tray 54 is provided with a plurality of spaced, parallel upstanding ridges, three of which are shown at 60. The ridges 60 are perpendicular to the ridges 56 and accordingly divide the recesses 58 into columns. Thus, the recesses 58 are arranged in columns and rows and are of rectangular configuration by virtue of the enclosing perpendicular ridges 56 and 60.

As shown in FIG. 6, each of the wedge-shaped portions 50 of the plungers 42 is received in a recess 58, said portions 50 extending the entire space between adjacent ridges 60.

As shown in FIG. 2, the table 12 is provided with laterally extending, relatively closely spaced bores 62. The bores 62 are located immediately under each of the wedge-shaped portions 50 of the plungers 42. As shown in the drawings, the bores 62, together with the bores 32 and 34 of the heater block 30, receive cartridge type electrical resistance heaters (not shown) for a purpose to be explained.

As particularly shown in FIG. 7, the uppermost protruding end portion of each of the plungers 42 is provided with a recess 64. Each of the recesses 64 receives a refractory material heat insulator 66 of spherical configuration. As shown in FIGS. 1 and 2, mounted to the topmost portion of the rails 14 and 16 is a generally rectangular pressurized air manifold block 68. For example, the manifold 68 may be secured to the rails by machine screws 70. With reference to FIGS. 1 and 8, manifold 68 is provided with a laterally extending passageway 72 communicating with a plurality of vertically extending passageways, some of which are indicated at 74 and 76. The passageway 72 communicates with a fitting 78 provided in one end of the manifold 68 and adapted to be coupled to a source of pressurized air. Each of the passageways, such as passageways 74 and 76, is provided with a vertically slidable piston, such as the pistons 80.

With reference to FIG. 7, each of the pistons is provided at its lowermost end portion with a recess 84 which registers with a respective spherical heat insulator 66. For example, each of the pistons, such as the pistons 80, is provided with a sealing ring 86 at its uppermost end portion to prevent escape of pressurized air from the passageways, such as the passageways 74 and 76.

The device is particularly adapted for bonding rows of solar cells to a common electrical terminal in strip form.

In operation of the device, reference will be made to FIGS. 5 and 6. Each of the rectangular configured recesses 58 are sized specifically to receive a solar cell of a well-known type. For example, as shown in FIG. 5, a solar cell 88, shown in each recess 58, is of a type provided on its undersurface with an electrical contact 90 of silver-titanium deposited on a grid matrix. The obverse surface of each cell 88 is provided with an electrical contact 92 of tab form.

An interconnector 94 is illustrated in FIGS. 5 and 6 and comprises a strip of silver mesh. Each strip interconnector 94, shown in its elongated form in FIG. 6, extends across a row of cells 88 and overlies the ridges 60 separating the row of cells. As shown in FIG. 5, a portion 96 of each strip interconnector 94 overlies one of the ridges 56 along its entire elongated length. Said portion 96 further overlies the tab terminal 92 of each cell 88 in the row of cells and may be provided with a raised arch portion so as not to engage the ridge 56 which separates adjacent rows of cells.

A portion 98 of the interconnector 94 adjacent to the arch portion extends in tucked position under each cell 88 of an adjacent row of cells opposite the separating ridge 56. The tucked portion 98 thus underlies a portion of the terminal 90 of each cell 88 in said adjacent row of cells. It is understood that the interconnector 94 is sufficiently pliable to conform to tucked positions under the cells and yet overlie each of the ridges 60 separating such cells.

With the mesh interconnector overlying the terminals 92 of the respective cells 88, the wedge-shaped portion 50 of each plunger 42 is brought into registrations with the mesh interconnector and a respective contact 92 of each cell 88. As shown in FIGS. 5 and 6 of the drawings, the wedge-shaped portion 50 of each plunger effects a line contact entirely along the length of a contact 92. When not in use a selected plunger may be lifted individually by grasping an associated machine screw 52 and rotating the plungers until the slot portion 46 registers with the machine screw 48, thereby maintaining the plunger elevated above the tray.

The entire apparatus 10, together with the plurality of cells 88, is placed in an evacuation chamber (not shown). The chamber is then evacuated to a near vacuum environment. A source of pressurized air (not shown) is supplied to the manifold 68, causing transmission of force through the pistons 80 to the plungers 42. Accordingly, clamping pressure is supplied along the line contact established by the wedge-shaped portion 50 of each plunger 42 along the length of the electrical contacts 92 of the solar cells 88. Simultaneously, the resistance heaters of the block 30 are activated by a voltage source (not shown) thereby transmitting heat from the heater block 30, through the pistons 42, and through the line contact established by the wedge-shaped portions 50 of each of the plungers.

Additionally, heat is supplied from resistance heaters in the table 12 upwardly through the solar cells and through the line contact established by the wedge portions 50. Accordingly, by the application of pressure and heat, bonding of the silver-mesh interconnector 94 and the silver-titanium contact of the solar cells 88 is accomplished. More specifically, the application of heat and pressure along the line contact established by the wedge-shaped portions 50 of the plungers 42 diffuses the silver mesh into the silver-titanium contacts, thereby insuring a positive diffusion bonding therebetween.

The tray 54 is reciprocable in the direction of the arrow 100 in order to bring successive rows of cells 88 into alignment with the plungers 48 and effect the required bonding to their common interconnector 94.

Additionally, the terminals 90 of the cells 88 are joined to their common interconnector by turning over the rows of cells, with the result that the portions 98 of the interconnector overlie the terminals 90 when the cells are placed in the tray. By engaging the wedge-shaped portions 50, a bond between the portions 98 of the interconnector and the terminals 90 may be effected according to the procedure described.

In practice, pressures of 500 to 5000 p.s.i. are supplied with the pressure in the vacuum chamber reduced below 100 microns. Such reduced pressure environment reduces oxidation during bonding, minimizes heat losses due to convection, and permits evaporation of unfused liquid state silver to create a precise bonding along the established line contact. Pressure is retained along the line contact for the time period in the range of 1–30 minutes, during which time the local temperature thereof is raised to the range of 250° C.–550° C. by the resistance heaters 62. Subsequently, the heaters are turned off electrically and the vacuum chamber is backfilled with an inert gas such as argon. When the temperature surrounding the line contact drops below 300° C., the vacuum chamber is opened and ambient air is forcibly blown over the apparatus 10 and the joined solar cells until the temperature thereof is reduced.

Such a bond fabricated by the above process is advantageously of lightweight since no solder or fasteners are required. The bond is of high quality because there is no human error involved in the fabrication thereof. It was established by experiment that the bond will withstand temperatures as high as 500° C. and bombardment with 1.25 Mev. electrons at $3 \times 10^{14}$ particles per square centimeter without degradation of the electrical contact between the interconnector and the contacts of the solar cells 88.

Whereas the preferred embodiment of the invention is utilized to bond silver to to silver-titanium, both the process and apparatus according to the invention may be utilized to join other metals, such as aluminum, by the application of pressures in the range of ½ the yield strength to the yield strength of a metal to be joined and temperatures in the range of ½ the melting point to the melting point of said metal.

Other modifications and preferred embodiments of the present invention are probable. For example, the force applying plungers according to the invention may be automatically rather than manually raised and lowered, thereby adapting the apparatus according to the invention for mass production techniques. Magnets 102, as shown in FIG. 5, may be provided to retain the solar cells and the tucked portions of the interconnector on the tray. Accordingly, the spirit of the invention is to be limited only by that recited in the appended claims, wherein

What is claimed is:

1. A process for diffusion bonding a silver metal interconnecting member to a silver-titanium metal terminal of a silicon solar cell wherein the metal terminal is formed as an integral part of the silicon solar cell, comprising the steps of:

placing said silver metal interconnecting member and said silver-titanium metal terminal in overlapping relationship; clamping together the overlapping portions of the metal interconnecting member and metal terminal; placing the clamped metal interconnecting member and metal terminal in a near vacuum environment; applying heat, within the range of 250° C.–500° C., and clamping pressure, within the range of 500 p.s.i.–5000 p.s.i., to the overlapped clamped portions of the metal interconnecting member and metal terminal; and maintaining the application of the heat and clamping pressure under the near vacuum environment for a duration within the range of 1 minute–30 minutes to effect a diffusion bond between the overlapped portions of metal interconnecting member and metal terminal.

2. The process of claim 1, wherein the application of heat and clamping pressure to the overlapped clamped portions is effected in an environment pressure of 100 microns or less.

3. A process for diffusion bonding an interconnecting silver strip to silver-titanium terminals of a row of silicon solar cells comprising the steps of:

extending said silver strip across said silver-titanium terminals of said row of solar cells in overlapping relationship; clamping the overlapped portions of said silver strip and said silver-titanium terminals; placing the clamped silver strip and silver-titanium terminals in a near vacuum environment; applying a clamping pressure within the range of 500–5000 p.s.i. and heat within the range of 250° C.–550° C. to the overlapped clamped portions, and maintaining the application of heat and pressure under the near vacuum environment for a duration within the range of 1–30 minutes.

References Cited

UNITED STATES PATENTS

| | | | |
|---|---|---|---|
| 3,147,414 | 9/1964 | Pelfrey et al. | 29—492 X |
| 3,053,923 | 9/1962 | Stearns | 136—206 |
| 3,106,489 | 10/1963 | Lepselter | 136—89 UX |
| 3,154,847 | 11/1964 | Chapman et al. | 29—498 X |
| 3,186,874 | 6/1965 | Gorski | 136—89 |
| 3,297,552 | 1/1967 | Gisser et al. | 29—199 X |
| 3,442,007 | 5/1969 | Griffin et al. | 136—89 X |
| 3,449,820 | 6/1969 | Jones et al. | 29—498 X |
| 3,493,822 | 2/1970 | Iles | 136—89 X |

OTHER REFERENCES

Garrett et al., "Broad Applications of Diffusion Bonding," NASA CR–409, Mar. 25, 1966, pp. XII, 19–26, 117.

Hui et al., "Solderless Connections to Silicon Solar Cells," RCA Publication TN No. 845, August 1969.

JOHN F. CAMPBELL, Primary Examiner

R. J. SHORE, Assistant Examiner

U.S. Cl. X.R.

29—498, 504